April 8, 1958  L. FEINSTEIN  2,830,202

UNI-DIRECTIONAL ACCELEROMETER

Filed Sept. 22, 1955

INVENTOR
LESTER FEINSTEIN

BY Michael Hertz

ATTORNEY

United States Patent Office 2,830,202
Patented Apr. 8, 1958

2,830,202

UNI-DIRECTIONAL ACCELEROMETER

Lester Feinstein, Palo Alto, Calif., assignor to Sylvania Electric Products Inc., a corporation of Massachusetts Application September 22, 1955, Serial No. 535,878

7 Claims. (Cl. 310—8.4)

The present invention relates to an improved piezo-electric accelerometer and to a method for making the same.

Piezo-electric accelerometers are well known; however in such devices the desired sensitivity heretofore was obtained only by careful machining of the crystal and the seismic element or mass, by utilizing stressed mechanical components, such as springs to press the crystal and mass into mutual contact and by moisture-proofing the unit thus formed by the use of elaborate sealing arrangements. The cost of the prior devices therefore was increased by such machining and additional mechanical components and at the same time resulted in sacrifice of sensitivity and of ruggedness and simplicity in construction. The use of mechanical components to bias the crystal and seismic element into contact in the previous devices, frequently permitted separation of the crystal and element at extreme accelerations thereof, thereby causing faulty measurements.

It is accordingly an object of the invention to provide a sensitive accelerometer having simplicity and ruggedness in construction. Another object is to decrease the number of components, particularly the number of machined components, and more particularly, in one method of manufacture, to eliminate altogether the necessity of using machined parts in an accelerometer. A further object of the invention is to provide an accelerometer which is compact and moistureproof. Still another object is the provision of an accelerometer adapted for measuring extreme accelerations. Other objects and advantages of the invention will appear as this description proceeds.

The features of the invention which are believed to be novel are pointed out in the claims appended to this specification. For a better understanding of the invention, reference is made in the forthcoming description to the accompanying drawing, in which:

Figure 2:
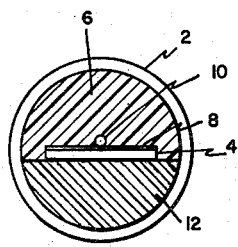
Fig. 2 is a sectional view along line 2—2 of Fig. 1.
Figure 1:
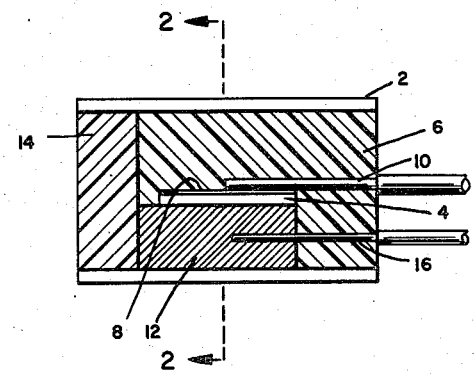
Fig. 1 is a sectional view, for clearness some parts not being sectioned, of an accelerometer illustrating one form of the invention.
Figure 3:
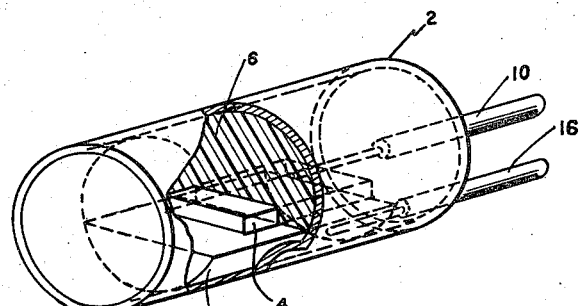
Fig. 3 is a perspective view of Fig. 1 with parts broken away and other parts in section.

Referring more particularly to Figs. 1–3 the reference character 2 denotes a housing which may be open-ended and cylindrical in shape. It is contemplated that the housing may be provided with fittings (not shown), or welded, for rigid attachment to a body whose vibratory or acceleratory movements when subjected to shock energy excitation are desired to be known.

A crystal 4 of barium titanate or other material having piezo-electric properties is mounted within the housing 2, for generating a charge or electrical impulse in response to accelerating movement of the housing 2. The crystal 4 is embedded in the plastic insulating filling 6 such that one face of the crystal is free of the plastic material. The crystal 4 may be properly positioned within the housing 2 by a suitably shaped jig (not shown) while the liquefied filling 6 is being poured and hardened. For purposes of making electrical contact with the crystal 4 a metallic coating 8 is provided on one face of the crystal, to which coating the lead-in 10 is soldered. A seismic element 12 having a surface adapted to engage the exposed face, that is to say, opposite from the coated face of the crystal 4, is pressed or wedged into contact with the crystal and held in place by additional plastic material 14. If the element 12 is conductive, a lead-in 16 can be provided (Figs. 1 and 3) to make electrical contact therewith and with the exposed face of crystal 4, which is contiguous with the element 12. If the element 12 is non-conductive the exposed face may be provided with an electrode similar to that of the opposite face, as indicated by coating 8 and lead-in 10, thereon.

The seismic element 12 and the crystal 4 are biased into contact by the aforesaid wedging of the element 12 and by the resiliency of the plastic material 6 and 14 selected for the filler. Plastics sold under the commercial names of "Castilite" or "Cycle-weld" may be utilized. The sensitivity and natural vibratory frequency of the accelerometer can be varied widely as desired by judicious choice in mass and hardness of the seismic element 12 and in cross-section of the crystal 4, or selection of a plastic filler material having appropriate resilient properties.

To avoid the necessity of carefully machining a face of the crystal 4 and the complementary surface of the seismic element 12, the element may be positioned in a fluid state. If such is the case, the crystal 4 is embedded in the filler 6 having an exposed face as described heretofore. After inserting the lead-in 16 through the filler 6 and after the latter hardens, a molten solder or other metal of suitable melting point is poured into the space to be occupied by the seismic element 12. In order to provide a resilient bias maintaining the element 12 in engagement with the crystal 4, a metal expansible on cooling is selected; and it follows that the degree of such bias can be varied by proper selection of the metal or alloy utilized, or of the plastic material which acts as a stiff spring compressing the crystal 4 and element 12 between the fillers 6 and 14 and the housing 2 and preventing separation of said crystal and element even at extreme accelerations, thereof.

Figure 4:
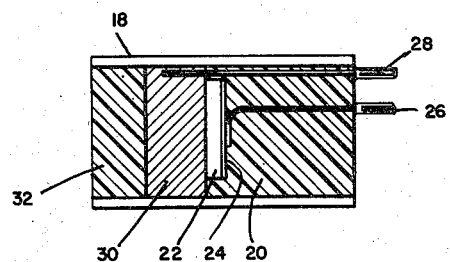
Fig. 4 is a sectional view of another accelerometer constructed in accordance with the principles of this invention.

In Figs. 1–3 the accelerometer there illustrated is intended to measure vibrations or other acceleratory movements in a direction normal to the long axis of the housing 2, as determined by the orientation of the crystal 4. One possible re-orientation of the components is illustrated in Fig. 4, to permit measurements of accelerations parallel to the long axis of the housing 18. In constructing this form of the invention, a jig, such as mentioned in connection with Figs. 1–3, is not necessary. The housing 18 is placed in a vertical position and the lower end provided with suitable backing. The housing 18 is then partially filled with a settable liquid filler 20. Before the filler 20 has completely set, the crystal 22 provided with an electrode comprising the coating 24 and the lead-in 26 is embedded in the filler 20 and the lead-in 28 inserted therein from the open end of the housing 18. The seismic element 30 is then pressed into contact with the crystal 22 or poured in molten form, as described heretofore. The remainder of the housing 18 is filled with an additional quantity 32 of settable liquid filler to resiliently bias contact between the crystal 22 and the element 30.

It will be apparent that, if desired, the lead-in 28 of Fig. 4 or the lead-in 16 of Figs. 1–3 may be eliminated and contact with the elements 30 or 12, respectively, be made through the respective housings 18 or 2. It is likewise evident that no further moisture proofing or sealing is required for the accelerometer made in accordance with the principles of this invention, where moisture resistant fillers 6 and 14, or 20 and 32 have been employed.

In operation, referring to Figs. 1-3, the housing 2 is welded to or mounted on the body (not shown) whose acceleration normal to the long axis of the housing is to be measured, by means of appropriate fittings, not shown. Upon the application of shock energy to the body, the housing 2, will be vibrated back and forth with the body. If the instantaneous acceleration imparted to the housing is assumed normal to the large face of the crystal 4, the inertia of the seismic element 12 will effect the resilient bias maintaining the crystal 4 and element 12 in contact and thereby vary the compression to which the crystal 4 is subjected. The piezo-electric property of the crystal 4 causes a charge or voltage to be produced proportional to the acceleration or shock to be measured. The voltage across the lead-ins 10 and 16 may be fed through suitable circuitry to an appropriate cathode-ray oscilloscope or other indicating apparatus.

From the foregoing it will be apparent that the arrangements and methods for mounting the piezo-electric crystals and their respective seismic elements within the housings 2 or 18 provide novel and efficient accelerometers of light weight and small size. Moreover the accelerometer is capable of wide variations in size, sensitivity, and natural frequencies. The unit is moisture proof and its component parts are small in number and, additionally, do not require close tolerances.

Numerous modifications of the constructions described herein will occur to those skilled in the art without departing from the spirit and scope of the present invention. Accordingly, it is intended that all matter contained in the accompanying drawing be interpreted as exemplary in nature and not in a limitative sense.

Therefore, what is claimed as new is:

1. An accelerometer comprising a housing; a plastic insulating filling in said housing; a piezo-electric crystal at least partially embedded in said filling, said crystal having first and second faces; a conductive seismic mass positioned within and solely confined by both said housing and filling and having a surface engaged with the second one of said faces; a first lead-in in electrical connection with said first face and a second lead-in in electrical connection with the seismic mass.

2. An accelerometer comprising a housing; a plastic insulating filling in said housing; a piezo-electric crystal at least partially embedded in said filling, said crystal having first and second opposing faces; a conductive coating covering at least a portion of said first face, a conductive seismic mass positioned within and solely confined by both said housing and filling and having a surface engaged with the second one of said faces; a first lead-in in electrical connection with said conductive coating; and a second lead-in in electrical connection with the seismic mass.

3. A unidirectional accelerometer comprising an elongated housing; a plastic insulating filling in said housing; a piezo-electric crystal at least partially embedded in said filling, said crystal having first and second opposing faces arranged parallel to the long axis of the housing; means making electric connection to the first face; and a conductive seismic mass with means making electrical connection thereto positioned within and solely confined by both said housing and filling and having a surface engaged with the second one of said faces to vary the compression in said crystal under the influence of accelerations normal to said axis.

4. An accelerometer comprising a housing; a plastic insulating filling in said housing; a barium titanate crystal at least partially embedded in said filling, said crystal having first and second faces; a conductive seismic mass positioned within and solely confined by both said housing and filling and having a surface engaged with the second one of said faces; a first lead-in in electrical connection with said first face; and a second lead-in in electrical connection with the seismic mass.

5. A method for making an accelerometer, said method comprising the steps of positioning a piezo-electric crystal within a housing; filling a first space enclosed by said housing with a plastic material leaving at least one face of said crystal opposed to a second space enclosed by said housing; partially filling said second space with a fused metal expansible upon freezing, said metal contacting at least a portion of said face; and filling the remainder of said second space with plastic material.

6. An accelerometer comprising a housing; a plastic insulating moisture-resistant filling in said housing; a piezo-electric crystal at least partially embedded in said filling, said crystal having first and second faces; a conductive seismic mass positioned within and solely confined by both said housing and filling and having a surface engaged with the second one of said faces; a first lead-in in electrical connection with said first face; and a second lead-in in electrical connection with the seismic mass.

7. An accelerometer comprising a housing; a plastic insulating filling in said housing; a piezo-electric crystal at least partially embedded in said filling, said crystal having first and second faces; a conductive seismic mass, having a negative coefficient of expansion, positioned within and solely confined by both said housing and filling and having a surface engaged with the second one of said faces; a first lead-in in electrical connection with said first face; and a second lead-in in electrical connection with the seismic mass.

References Cited in the file of this patent

UNITED STATES PATENTS

| | | |
|---|---|---|
| 2,386,692 | Kuenstler | Oct. 9, 1945 |
| 2,558,563 | Janssen | June 26, 1951 |

OTHER REFERENCES

Wireless World, for July 1954, p. 314.